Figure 1:
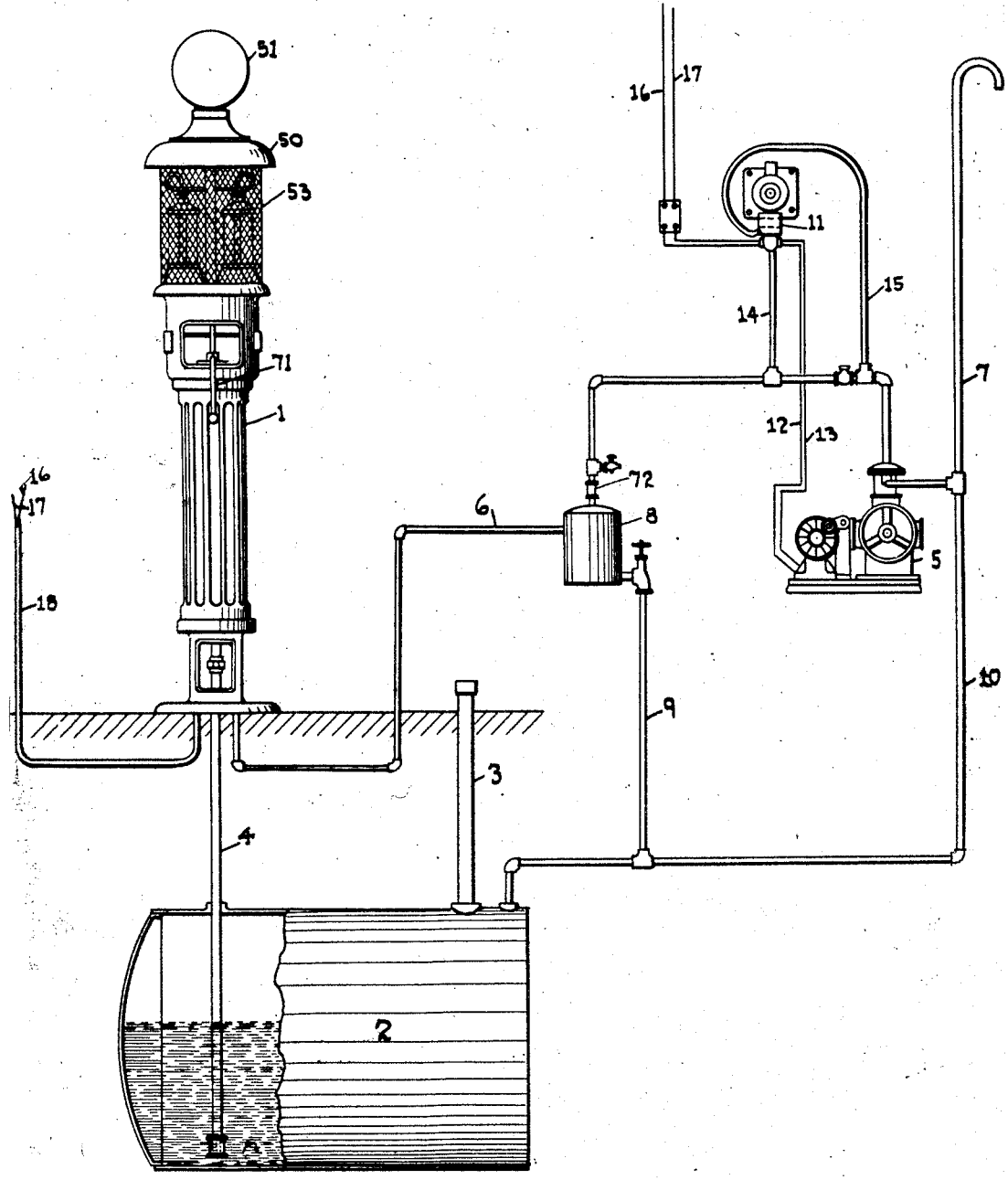

Jan. 5, 1926.　　　　　　　　　　　　　　　　　　　　1,568,518
G. W. MacKENZIE
LIQUID DISPENSING APPARATUS
Filed Oct. 24, 1922　　　　6 Sheets-Sheet 1

WITNESSES
David N. Erikson
Percy A. English

INVENTOR
George W. MacKenzie
by Christy and Christy
his attorneys

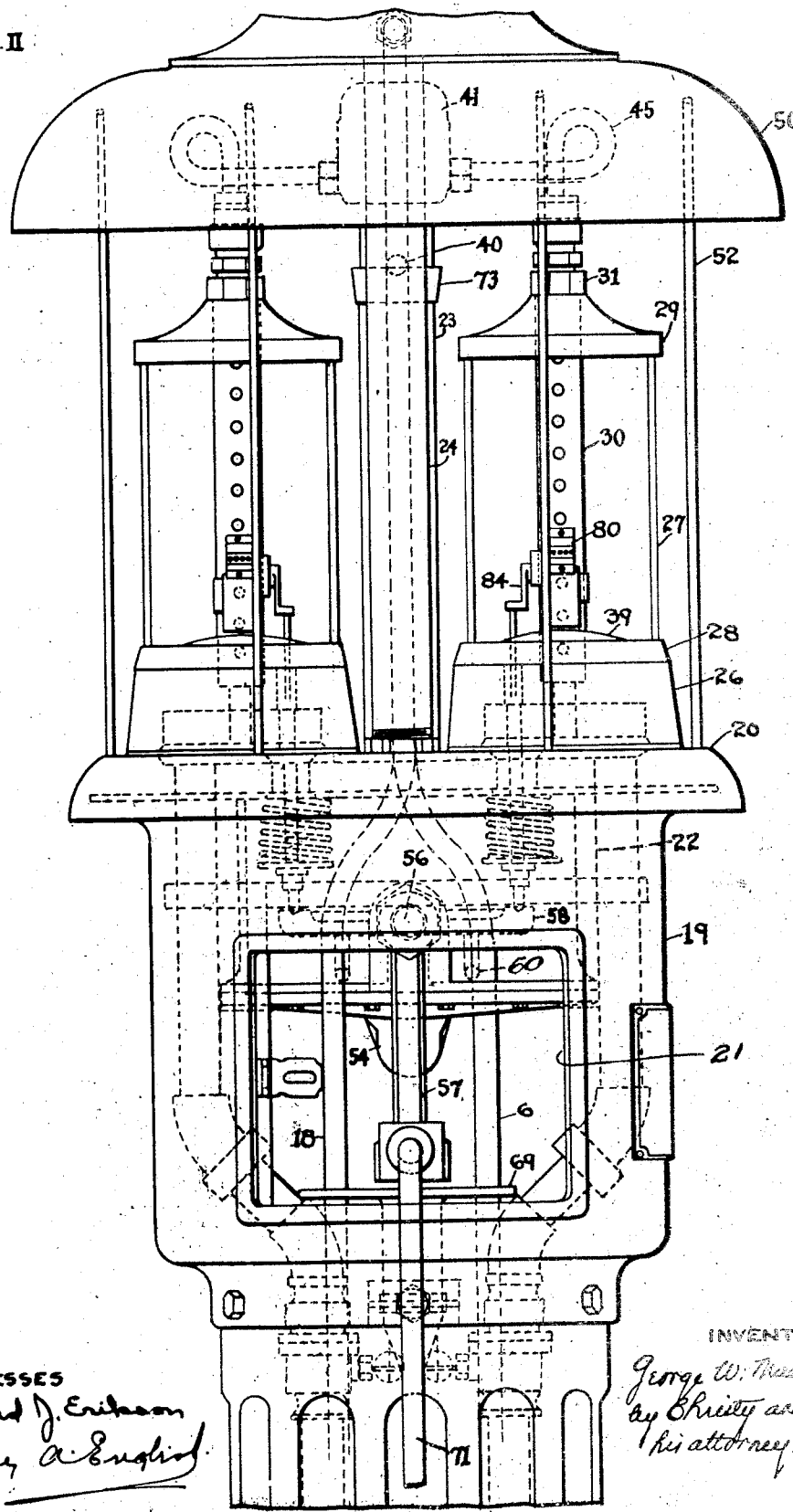

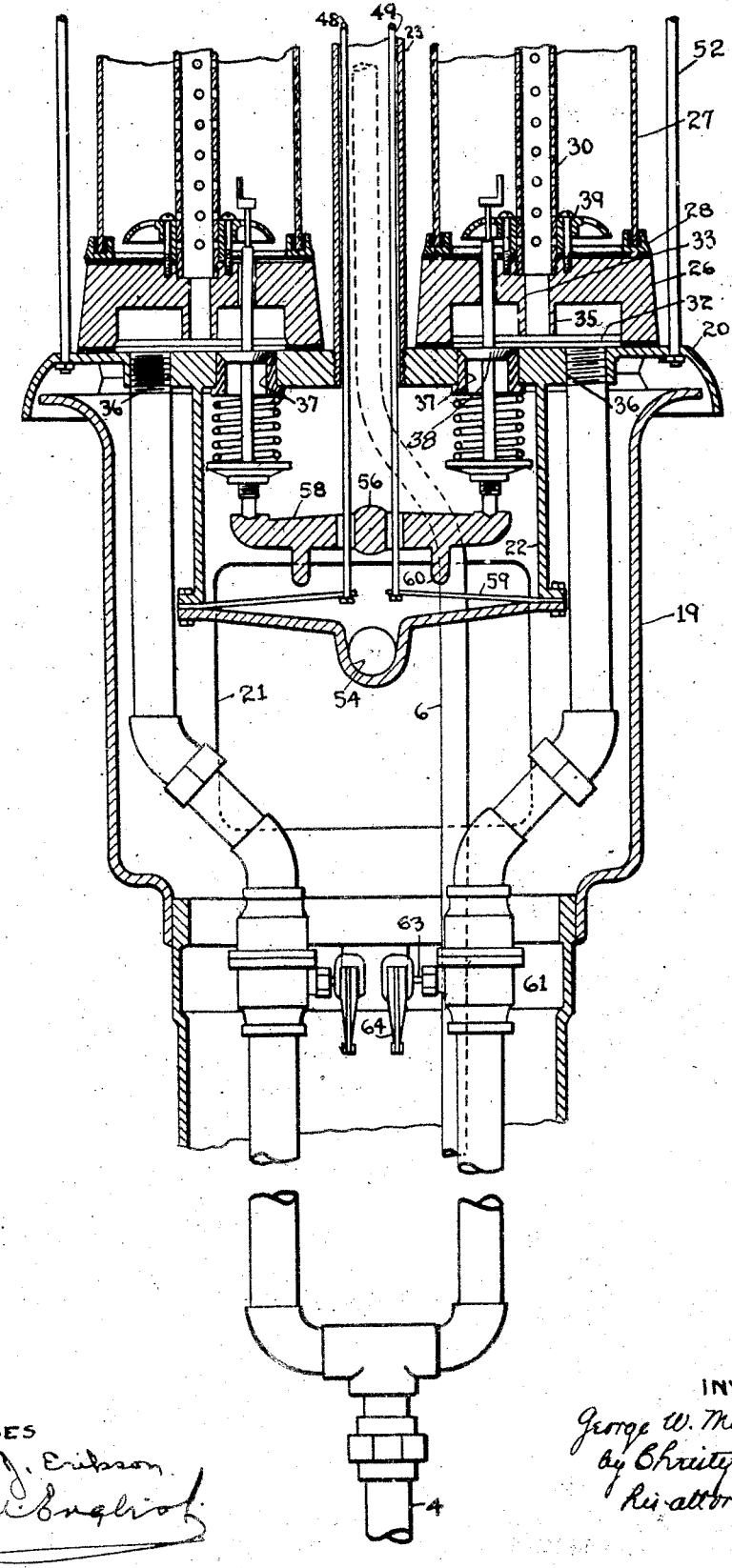

Jan. 5, 1926.   1,568,518
G. W. MacKENZIE
LIQUID DISPENSING APPARATUS
Filed Oct. 24, 1922   6 Sheets-Sheet 4
FIG. IV
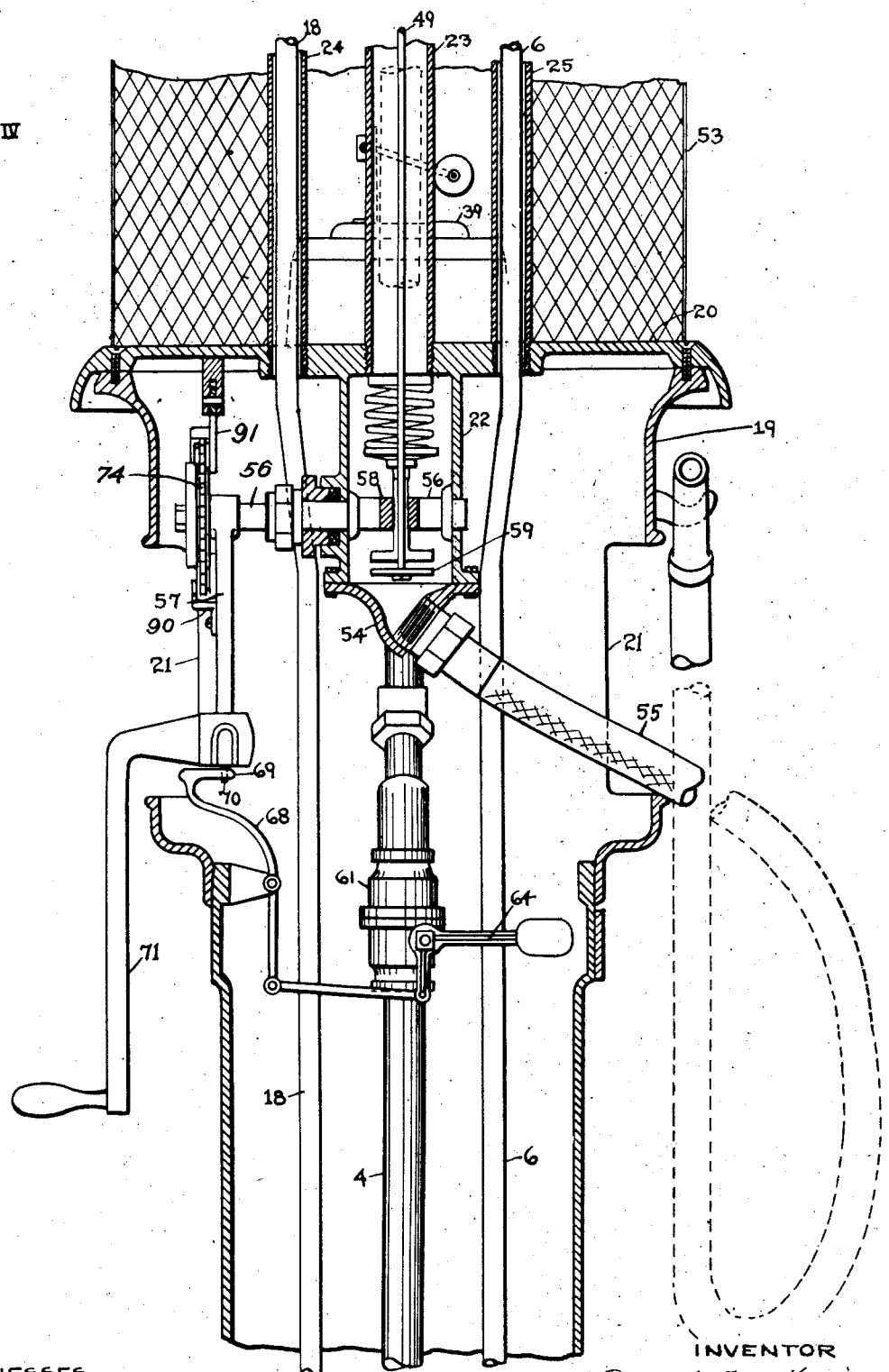
WITNESSES
David J. Erikson
Percy A. English
INVENTOR
George W. MacKenzie
by Christy and Christy
his attorneys Jan. 5, 1926.
G. W. MacKENZIE
1,568,518
LIQUID DISPENSING APPARATUS
Filed Oct. 24, 1922      6 Sheets-Sheet 5
FIG. V
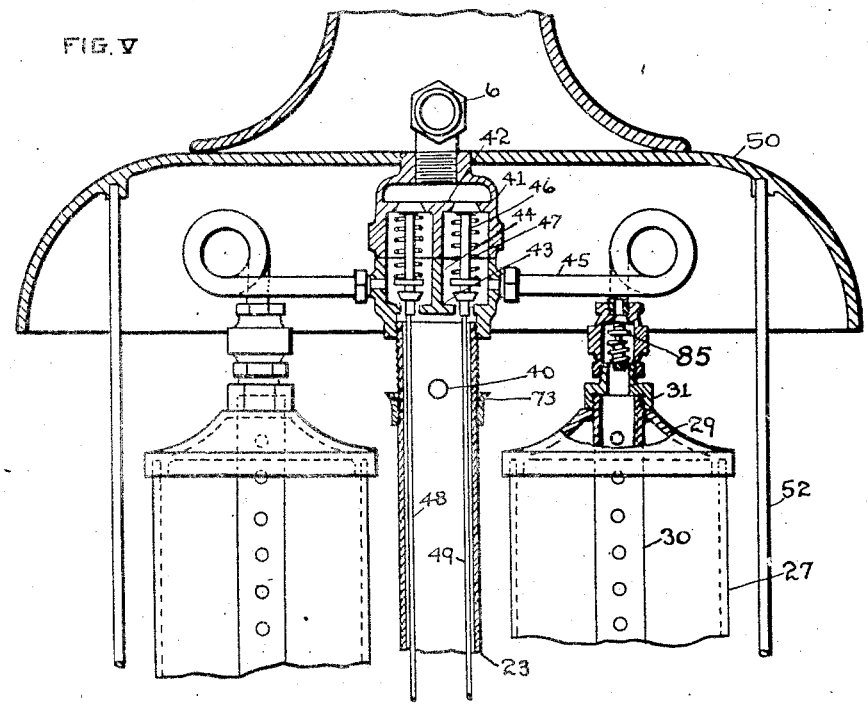
FIG. VI
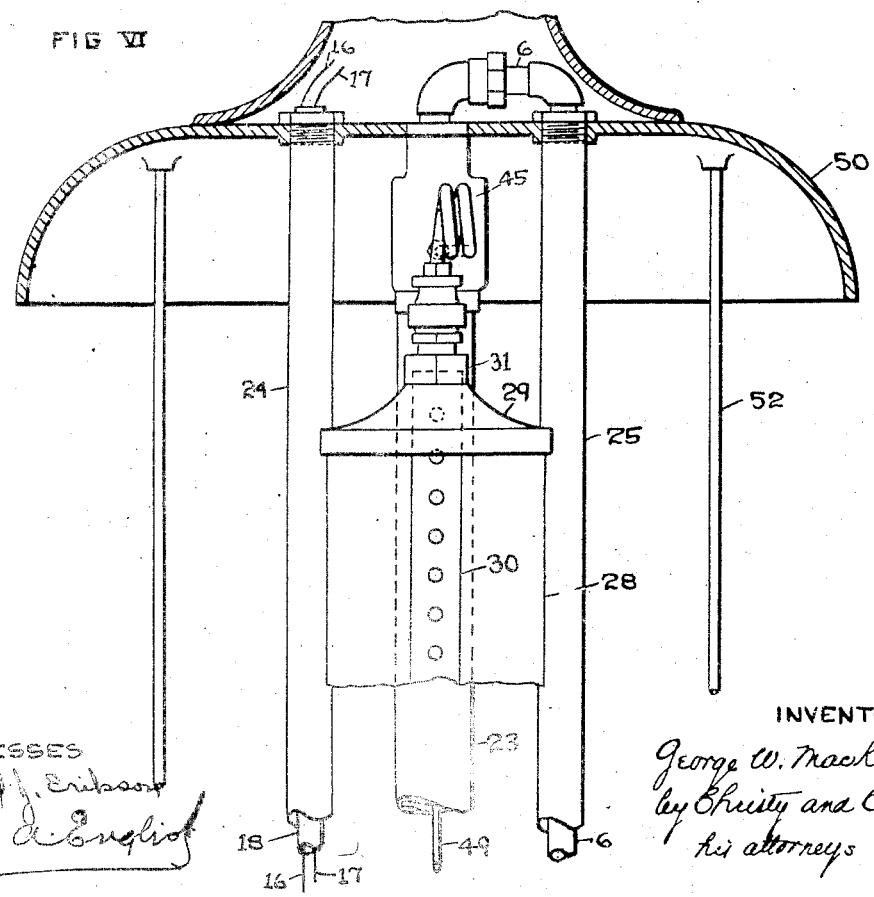
WITNESSES
INVENTOR
George W. MacKenzie
by Christy and Christy
his attorneys Jan. 5, 1926.　　　　　　　　　　　　　　　　　　　　1,568,518
G. W. MacKENZIE
LIQUID DISPENSING APPARATUS
Filed Oct. 24, 1922　　　　　6 Sheets-Sheet 6
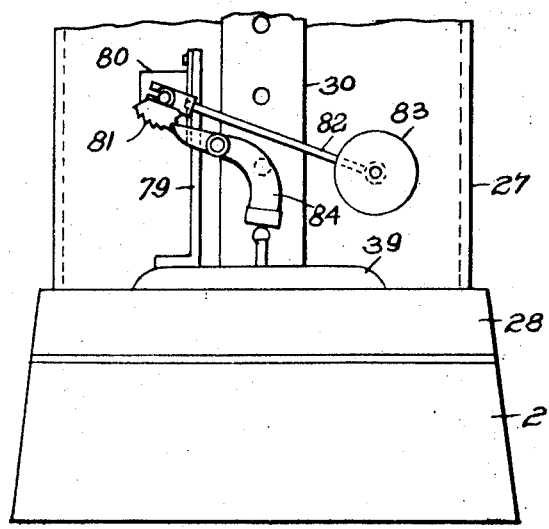
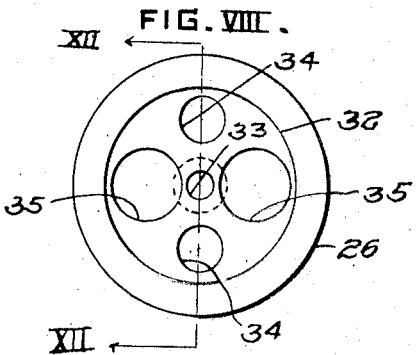
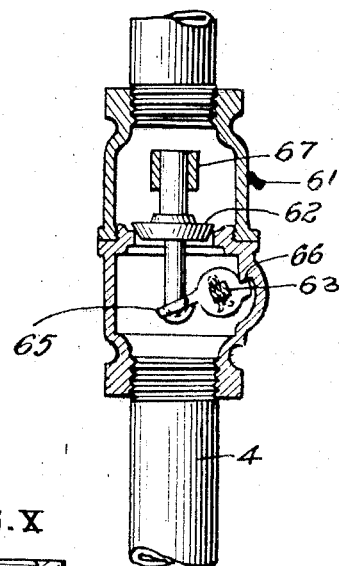
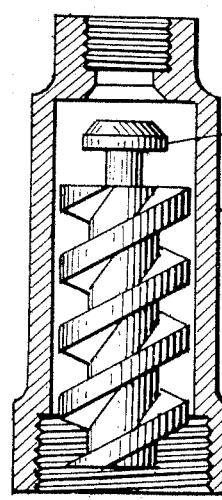
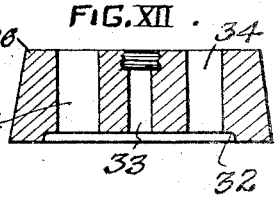
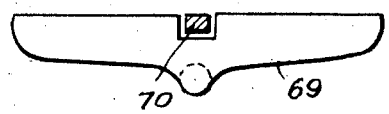
INVENTOR
George W. MacKenzie
by Christy and Christy
his attorneys
WITNESSES
J. Herbert Bradley
Percy A. English Patented Jan. 5, 1926.

1,568,518

UNITED STATES PATENT OFFICE.

GEORGE W. MacKENZIE, OF SPRINGFIELD, ILLINOIS.

LIQUID-DISPENSING APPARATUS.

Application filed October 24, 1922. Serial No. 596,586.

*To all whom it may concern:*

Be it known that GEORGE W. MACKENZIE, residing at Springfield, in the county of Sangamon and State of Illinois, a citizen of the United States, has invented or discovered certain new and useful Improvements in Liquid-Dispensing Apparatus, of which improvements the following is a specification.

My invention relates to gasoline dispensing apparatus, and consists in improvements in apparatus of the type and general character of my now-pending application for United States Letters Patent, filed February 16, 1922, Serial No. 536,892. The objects of improvement are simplicity of structure and accuracy and efficiency in service.

The invention is illustrated in the accompanying drawings. Fig. I is a general and diagrammatic view of a gasoline station in which my present invention is embodied. Fig. II is a view to larger scale and shows in front elevation the garoline-dispensing fixture. Fig. III and IV are views in medial and vertical section and in planes at right angles one to the other, of the lower portion of the dispensing fixture with its contained apparatus. Figs. V and VI are corresponding views of the upper portion of the fixture. Figs. VII-XII illustrate details; Fig VII shows in elevation a certain registering mechanism in situ; Fig. VIII is a view in plan from beneath of a certain part hereinafter spoken of as a base block; Fig. IX is a view in vertical section through a certain valve chest showing the contained valve and its immediately associated parts; Fig. X is a similar view through another valve chest showing its contained valve; Fig. XI illustrates the inter-engagement of a certain lever with the operating handle; and Figure XII is a view in vertical section through the base block already mentioned, the plane of section being at right angles to that of Figure III and indicated at XII—XII, Fig. VIII.

Referring first to Fig. I, the gasoline vending fixture is indicated at 1. Ordinarily it stands upon a suitable foundation by a curb stone of a street or like place, adjacent to the runway of the automobiles to be served. Beneath the ground level is a gasoline storage tank 2, to which leads a filler pipe 3, and from which rises a supply pipe 4 to fixture 1. An air pump 5 exerts suction through pipe 6 which leads from fixture 1, and discharges through a pipe 7 to the atmosphere. A condenser 8 is arranged in the line of flow through suction pipe 6, and from condenser 8 as well as from discharge pipe 7 return pipes 9 and 10 for condensed gasoline lead back to tank 2. Thus the air drawn by the pump through pipe 6 is relieved of its burden of gasoline vapor before being discharged through pipe 7. A vacuum-controlled switch 11 placed in the electric circuit 12, 13 which feeds the motor for pump 5, automatically limits the degree of suction which the pump when in operation exerts through pipe 6. The pneumatic connections for this automatic switch are indicated at 14 and 15. The circuit 16, 17 which feeds the light bulb set in fixture 1 (as presently will be described) may be led through conduit 18 to fixture 1.

Turning to Figs. II–VI, the fixture 1 will be seen to include a suitable casing 19 with a horizontally disposed apertured top or platform 20 and with openings 21 in its side walls which may be covered by sliding doors. Figs. III and IV show platform 20 bolted upon the walls of casing 19 with a marginal flange overhanging in eaves-like manner the line of union.

From the under side of platform 20 and within the walls of casing 19 hangs a tight chamber 22. Into a central aperture through platform 20 is screwed the lower end of a conduit 23 which rises vertically from the platform. Conduit 23 opens from chamber 22 below. At an elevated point this conduit is vented, as at 40.

On either side of conduit 23 and diametrically opposite one another rise two more conduits, 24 and 25, also set in apertures in platform 20. These, however open, not from the central chamber 22, but from the surrounding space between chamber 22 and the walls of casing 19.

On opposite sides of conduit 23, and at quadrant points between conduits 24 and 25, the platform carries the two measuring chambers. Each measuring chamber stands on a chambered base block 26. Each base block rests directly upon platform 20 and is secured to the platform by means of cap screws, gaskets being interposed between its rim and the platform. The measuring chambers are cylindrical in form and consist of bodies 27, formed ordinarily of glass, and opposite metal heads 28, 29. The heads are provided with grooves for receiving the rims of the cylindrical glass bodies and for forming therewith hermetically tight joints. The cylindrical measuring chambers stand on end, on the two base blocks 26, and are secured upon the blocks by being bolted thereto. Pipes 30 screwed into orifices formed centrally in base blocks 26, rise vertically from the blocks. The heads of the cylindrical measuring chambers are centrally orificed to permit of application upon these vertically standing pipes, and when the measuring chambers are in place, clamping nuts 31 secure them. It will of course be understood that the clamping pressure thus available may be employed to make tight the joints between the walls and heads of the cylinders.

The base blocks are particularly shown in Figures III, VIII and XII. They are in their external shape conical frusta. Internally each is chambered thus: (1) a shallow circular recess 32 of relatively large diameter is formed concentrically in the lower base of the frustum; (2) an axial bore 33 of relatively small diameter extends vertically through the block. Into the upper end of this bore the pipe 30 is screwed. (3) At four quadrant points remote from the axis four bores are drilled, one opposite pair 34, 34 of relatively small diameter extends through the block from lower base to upper, the other opposite pair 35, 35 of relatively large diameter extends but part way from the recess in the lower base of the frustum upwardly. A smaller opening for the passage of a valve stem does, however, penetrate beyond one of the pair of blind bores 35 the rest of the way through the block. The lower head 28 of each measuring chamber is merely an annulus and accordingly the bores 34 in the base block and the opening just mentioned through base block 26 for the valve stem lead without obstruction to the cylindrical measuring chamber.

As best shown in Fig. III, the platform 20 is provided on opposite sides with symmetrical pairs of orifices 36, 37—36, 37, arranged conveniently in diametrical line, and the blocks 26 are so arranged upon the platform that the shallow recess 32 in the lower base of each block covers a pair of these orifices, while the blind bores 35 are directly aligned above these orifices.

The pipes 30 which extend centrally through the measuring chambers are perforated at frequent intervals. Within each pipe 30, and approximately at the level of the uppermost perforation, is arranged an upwardly closing check valve 85. The seat to which valve 85 rises is, however, situated above the level of the uppermost perforation in pipe 30, and when the valve 85 is seated, as it is by suction from above, the flow induced by suction is cut off. The particular form which this check valve preferably takes is shown in Fig. XII. It is a valve whose weight is such and which in its range of play is so limited that unaided suction, which as presently will be explained, is during operation exerted through pipe 30 from above, is unable to raise it; but which, when, in response to continued suction, a tide of gasoline rises in the measuring chamber and in the pipe 30 and more or less completely submerges it and exerts its buoyancy upon it, then, responsive to the combined influences of suction and buoyancy, rises and closes. But more than that, the body of the valve is, as shown in Fig. IX, preferably prolonged and so particularly formed as to constitute with the wall of the pipe 30 a winding passageway. Through this winding passageway air will easily stream, but when in the course of operation the tide of gasoline rises and begins to stream through, the greater drag of the passage walls upon the passing stream of liquid will, buoyancy co-operating, bring the valve more promptly to its seat. The assembly is shown in Fig. V. Suction exerted through pipe 45 draws the gasoline into the measuring chamber, the rising tide of gasoline streaming through the spiral passage-way formed by and around the stem of valve 85, and the consequent buoyancy, so far overcome gravity that suction raises valve 85 to its seat and cuts off the flow.

Secured upon base blocks 26 are baffle plates 39 which overhang the openings 34 through the blocks, and so break the force of the incoming and outgoing streams of gasoline. These baffle plates are ported in alignment with the valve-stem openings through the base blocks already mentioned.

In the orifices 37 in platform 20 are spring-impelled, downwardly closing valves 38. The stems of these valves 38 are prolonged both upward and downward, and the upward extending stems penetrate with freedom of vertical motion blocks 26 and the heads 28 of the measuring chambers and the baffle plates 39 also.

Upon conduit 23 is mounted a valve chest 41. Indeed the conduit itself may be regarded as forming part of the valve chest. So regarding it, this valve chest is divided internally by upper and lower horizontal partitions 42 and 43 into three chambers, while the middle chamber of the three is subdivided by a medial vertical partition 44 into right and left middle chambers. The upper chamber communicates through pipe 6 with air pump 5; the lower chamber communicates with the open air through vent 40, while the two medial chambers communicate through pipes 45 with the upper ends of pipes 30 (above the valves contained in those pipes) within the measuring chambers.

In the horizontal partitions 42 and 43 are opposite pairs of ports, and double valves 46 are arranged within the middle chambers to move vertically up and down and to close one port or the other of the opposite pair while leaving the other port of the pair uncovered. Springs 47 are provided which tend to hold these valves both of them to their seats in the upper partition; thus normally suction is cut off and both measuring chambers are vented to the atmosphere. The stems 48, 49 of the two double valves extend downward through conduit 23 and into chamber 22, for purposes presently to be described.

The pipes 45 which connect the valve chest with the two measuring chambers, made preferably of copper, are advantageously formed as shown with spiral coils of one or more turns in their course. Such spiral coils serve two ends: they afford flexibility for assembly, and they constitute gasoline traps, as presently will be more clearly explained.

A hood 50 for the structure is conveniently secured to the conduits 24 and 25 at their upper ends and is carried thereby; the hood may be surmounted by a globe 51 containing an incandescent lamp. Additionally, tie rods 52 may be provided, extending between hood 50 and platform 20, and these may be adjustable. They aid in positioning the dome and securing it when in proper position, and they further afford support for a cage 53, commonly of expanded metal, which envelops the measuring chambers and all the mechanism between platform and hood.

The suction pipe 6 may rise within one of the conduits, 25, while through the other, 24, may be led the conduit 18 for the wires 16, 17 of the light circuit.

To the orifices 36 in platform 20 leads the forked feed pipe 4; from chamber 22 opens a discharge orifice 54 in which the familiar flexible delivery hose 55 may be secured.

Journaled in the opposite front and rear walls of chamber 22 (see Fig. IV) is a rotary shaft 56, for turning which a crank 57 is provided. The shaft 56 carries integrally a beam 58. Normally the parts stand in the position shown in Figs. II, III and IV; the crank hangs vertically downward, and the beam extends horizontally. As the crank is turned, the beam is swung.

In the walls of chamber 22 are anchored two leaf springs 59, and these springs engage, each one of the prolonged stems 48 and 49 of the double valves 46 which control connections from the measuring chambers with the air pump and with the open air.

The arrangement is such that depression of one of the springs 59 draws the corresponding valve 46 downward against the tension of the coiled spring 47 which normally sustains it in elevated position. Beam 58 is provided above with seats adapted to engage and as the beam swings to exert a substantially vertical thrust upward upon the downwardly prolonged stems, first of one and then of the other of the valves 38. Beam 58 is further provided below with bosses 60 adapted as the beam swings, to abut upon and depress, first one and then the other of the leaf springs 59.

In each bifurcation of the forked pipe 4 is a valve chest 61, shown in section and to larger scale in Fig. IX. Within this chest is a valve 62 which, when free of associated instrumentalities about to be described, acts as a downwardly seating check valve. Through the valve chest and journaled in its walls extends a rotatable shaft 63; externally, this shaft carries a weighted bell crank lever 64; internally, it carries a crank arm 65 adapted, as the shaft turns, to engage the stem of valve 62 and through such engagement to unseat the valve (as the shaft turns clockwise, Fig. IX). Shaft turning is limited in one direction by a shoulder 66 upon which an arm from the shaft abuts, and in opposite direction by a stop 67 against which the rising valve makes bearing. Normally the weighted lever holds the valve unseated and abutting upon stop 67.

Within casing 19 a lever 68 is pivoted, and this lever is linked to the two weighted bell crank levers 64. The parts as they are shown in Fig. IV are in neutral position; in that position the weighted bell crank levers 64 are effective to hold valves 62 in raised and inactive position. The upper end of lever 68 extends adjacent to handle 57, and it is there prolonged transversely in the form of a plate 69 (cf. Figs. II, IV and XI). Crank, or handle, 57 is provided with a downward extending pin 70 which throughout the range of swing of the handle engages plate 69. The engaging surface for this pin formed in plate 69 is such that in all positions of the handle but neutral the handle holds lever 68 swung aside (anti-clockwise, Fig. IV) and so valves 62 are free to act as check valves; but when the handle is in neutral position, the weighted bell crank levers 64 are allowed to turn and shift the valves 62 to open ineffective position. The shape of this plate 69 is shown in the plan view, Fig. XI, and from this figure it will be apparent how when pin 70 is opposite the notch in the edge of plate 69 lever 68 can swing (clock-wise, Fig. IV) in response to gravity acting upon weighted bell crank levers 64, but when the lever 68 has been swung anti-clockwise and then handle 57 has been turned from neutral position, engagement of the rim of plate 69 with pin 70 will hold bell crank levers 64 raised against gravity,—and, as has been explained, while the bell crank levers are so raised valves 62 are free to act as check valves. When the apparatus is about to be used the attendant, before he turns handle 57, first draws outwardly the upper end of lever 68. That is to say, he turns lever 68 anti-clockwise, as seen in Fig. IV, and in so doing he turns bell crank levers 64 against gravity until further turning is checked by abutment upon shoulders 66. Then, while still holding the end of lever 68 he turns handle 57 from neutral position. He may then release his hold upon lever 68 and weighted levers 64 will then be sustained in retracted position (allowing check valves 62 to function), until handle 57 comes to neutral position again. When the apparatus is to be put out of use, as when the station is closed, the attendant swings handle 57 back to neutral, and thereupon the notch in plate 69 comes opposite pin 70 and the weighted bell crank levers 64 throw both valves 62 to open and inactive position.

Operation of the structure thus far described will readily be understood. At the outset lever 68 is swung anti-clockwise (Fig. IV). This allows valves 62 to come into play and serve as check valves in the two branches of feed pipe 4. Crank 57 is then turned. This effects swinging of beam 58. According to the position of beam 58, the valve assembly 38, 38, 46, 46 stands in one or another of three desired positions. One of these three positions is that shown in the drawings, the neutral or inactive position, wherein beam 58 extends horizontally, both valves 38 are by their controlling springs held in closed position, and both valves 46 are by their controlling springs 47 held in such position that both measuring chambers are vented to the open air. According to crank 57 is turned from its vertical position to right or to left through a predetermined range of angular turning, beam 58 is swung from horizontal position to a position of inclination to left or to right. As beam 58 swings (clock-wise, Figs. II and III), while it leaves valve 38 on the right closed, it engages the stem of valve 38 on the left and unseats it; at the same time, leaving valve 46 on the left in its same venting-to-air position, it shifts valve 46 on the right, and (pump 5 being brought meanwhile into action) sets up a condition of suction in the measuring chamber on the right. Subsequent turning of crank 57 from one limit of its range across the neutral position (shown in the drawings) to the opposite limit, will effect a reversal of the position of beam 58 and a corresponding complete reversal of the positions of the complementary set of valves 38, 38, 46, 46.

Beginning then with the neutral position shown, the turning of crank 57 clockwise (Figs. II and III) will bring measuring chamber to the left to emptying condition (which, on the initial turning, is immaterial, since the chamber is already empty), but it will bring measuring chamber on the right to filling condition: that is to say, valve 38 on the right will remain closed, while valve 46 on the right will be shifted to the position in which, communication with the atmosphere being cut off, suction is exerted from pump 5 through pipe 6, pipe 30, measuring chamber, and pipe 4, to supply tank 1. In response to this suction a tide of gasoline will rise through pipe 4 past valve 62 in the right branch of pipe 4, and into the measuring chamber. As this tide rises and fills the measuring chamber and finally partially submerges the check valve 85 in the upper end of pipe 30, the suction effect will raise valve 85; the flow will be cut off, and the gasoline will stand, filling the measuring chamber. Meanwhile the check valve 62 in the left branch of the forked feed pipe 4 will have remained held to its seat. When, after this initial filling of one measuring chamber has been effected, crank 57 is turned from one limit of its range, in anti-clockwise direction, to the opposite limit, reversal of the valve system 38, 38, 46, 46, will cause the previously filled measuring chamber, on the right, to empty into chamber 22 and thence through pipe connection 55 to the tank in the consumer's automobile or other receptacle, and the previously empty measuring chamber, on the left, to fill. While the measuring chamber on the right is emptying, the check valve 62 on the right remains closed, acted on both by weight from above and by suction from beneath. Thus repeated reciprocal turns of crank 57 through the intended range will effect successive deliveries of gasoline in equal and predetermined units of volume.

The unit ordinarily will be a gallon, but of course it may be greater than that, or less. Turning of crank from either extreme position to neutral, attended as will be the case by release of bell crank levers 64, will effect no delivery of gasoline, but, to the contrary, will effect the return of whatever gasoline the fixture contains, back to storage tank 1.

The adjustment of parts is minutely such that the previously filled measuring chamber will open to discharge its volume of gasoline an instant before suction is set up in the opposite measuring chamber.

The fact that chamber 22 is always vented to the air, through the opening 40 in the upper portion of pipe 23, is advantageous in the outflow of gasoline from measuring chamber to chamber 22; for, when valve 38 begins to open, a pulsation of pressure which otherwise would be disturbing to a free and even discharge, is immediately relieved; and, furthermore, this venting of the chamber 22 above, allows free and full delivery through orifice 54 and pipe connection 55.

The neutral position of crank arm or handle 57 is that in which this member hangs vertically downward, and the member is weighted, to the end that when for any reason the handle is released by the attendant and left free, it will immediately return to neutral. When in the course of operation handle 57 is to be swung from one extreme of its range to the other, the attendant will hold lever 68 as handle 57 passes neutral, that lever 68 shall not swing as the pin 70 passes the notch in the edge of plate 69.

If when the check valve 85 in the upper end of each pipe 30 closes a small quantity of gasoline (a quantity well within the recognized margin of tolerance in gasoline vending be cut off above it, this small segregated quantity of gasoline will be carried back into the measuring chamber when in the further operation the valve opens again. The coils, alluded to above, in the line of connection 45 between measuring chamber and valve chest 41 serve as a trap, to collect gasoline which might otherwise be sucked through and into the valve chest. And when thereafter, as the tide of gasoline in the measuring chamber recedes, air flows through this line of connection, whatever gasoline has previously been cut off, including that which may be trapped in the coil, will be swept back with the stream of air into the measuring chamber.

Inasmuch as gasoline is exceedingly volatile, it will be impossible to prevent some vapor from working back along the suction pipe to the pump and even beyond the pump to the exhaust. There is in this no source of injury to the apparatus, but, in order to save the relatively small quantities of gasoline which otherwise would be wasted in this manner, the condenser 8 is arranged in the line of connection between fixture 1 and pump 5, and from this condenser, as well as from the exhaust pipe from the pump, return lines 9 and 10 for condensed gasoline lead back to storage tank 1. To guard against the suction of condensed and liquid gasoline from condenser to the pump, a check valve 72 is arranged in the pipe 6 adjacent the condenser and on the pump side thereof.

A cup 73 may encircle pipe 23 exteriorly and immediately beneath vent 40, to collect any dripping of condensed gasoline vapor at that point.

The internal shaping of the chambers and passageways in block 26 brings it about that the tide of gasoline as it rises and recedes flows in devious course and so the surge and recession are smooth and quiet; while the presence of the deflector 39 tends further to bring about the same effect.

The incidental conveniences in the arrangement of the fixture are apparent on examining Figs. II and IV. The casing 19 is adapted, when the apparatus is inactive, to receive and contain it all within closed doors. To that end, the opposite openings 21 are formed in casing 19 and doors are provided for the openings. The flexible hose 55 manifestly may be alternately slipped within the casing and drawn out through the opening. As for the handle 57, it may be made wholly or in part removable and replaceable. As shown in Figs. II and IV, the handle is a jointed handle. The inner joint, to which the numeral 57 is immediately applied, extends wholly within the casing 19; the outer joint 71 is elbowed, as appears in Fig. IV, and is removably united to the inner, so that when applied the two parts are rigid and swing as a unit in a plane perpendicular to shaft 56. The elbowed outer joint depends when applied, externally of casing 19, and the proportions of parts and of opening 21 are such as to give free play to the handle in turning. When the apparatus is to be left unattended, the outer section 71 of the handle is removed and the door closed.

Referring particularly to Figs. II and VII, upon baffle plate 39 already described is set a standard 79. To standard 79 is secured a tally 80. Upon the operating shaft of the tally is secured a ratchet segment 81, and from the shaft extends also a long arm carrying a float 83. To standard 79 is pivoted a finger 84. This finger at one end forms a tooth to engage ratchet 81 and at the other extends above the stem of valve 38, which, as has been explained, is prolonged upwardly, and extends through openings provided for its free passage through base block 26, cylinder head 28, and deflector plate 39. The arrangement is such that when valve 38 rises, abutment of its stem upon the end of finger 84 will swing the finger on its pivot, break the nicely adjusted engagement of the opposite and toothed end of the finger with ratchet 81 and leave the shaft of the talley free to turn (in anti-clockwise direction, as indicated in Fig. VII). The finger 84 is so weighted that it tends always to take the position of engagement with the ratchet.

Operation of this tally is as follows: Normally, and when inactive, the parts stand in the relative position shown in Fig. VII. As the measuring chamber which contains this apparatus fills, the apparatus continues in its inactive position: the toothed finger 84 engaging ratchet 81 prevents the turning of the talley shaft in response to the tendency of float 83 to rise. The float is so held depressed until after the measuring chamber has been completely filled. When thereafter in the sequence of the operation already described valve 38 is raised, finger 84 is swung, engagement of finger with ratchet is broken, and immediately float 83 rises to the limit of its range. When in sequence thereafter the tide of gasoline within the chamber recedes the float will descend with it, and then when valve 38 closes again the parts will be found again in the position shown in Fig. VII. The talley is so particularly constructed that record is made on the clockwise turning of the shaft, as seen in Fig. VII, that is to say, on the descent of the float.

Manifestly the invention is not limited to the vending of gasoline, but is applicable generally to the dispensing of liquids, or commodities that will flow, in units of volume.

I have minutely described the particular machine which I have built; in the ensuing claims I define those new mechanical features which constitute my invention; and in claiming them I claim them broadly, regardless of whether in details the exemplary showing which this particular machine affords be followed.

I claim as my invention:

1. In liquid-dispensing apparatus a fixture including a platform, a perforate pipe secured to an orifice in and rising from said platform, a measuring chamber encircling said pipe and resting upon said platform and secured in position by a nut applied to said perforate pipe above, a source of liquid supply communicating by means of a valved passageway to and through the orifice in said platform and through said perforate pipe to said measuring chamber, means for exhausting air from said measuring chamber, and means for withdrawing liquid from said measuring chamber.

2. In a liquid-dispensing apparatus a fixture including a platform, a base block secured to said platform having in its inner face a recess of relatively large transverse extent which when the block is applied forms with the platform a chamber, and the said base block having further a bore of relatively small diameter extending from said recess through the block to its outer face, a measuring chamber applied to said base block and to which when applied there is free communication through the bore in said base block, means for exhausting air from said measuring chamber, a source of liquid supply, said supply being in valve-controlled communication with the chamber formed by and between block and platform, through an orifice in the platform out of alignment with the bore through said block, and means for withdrawing liquid from said measuring chamber.

3. In liquid-dispensing apparatus a fixture including a platform, a perforate pipe secured to an orifice in and rising from said platform, a measuring chamber encircling said pipe and resting on said platform, the pipe and measuring chamber when assembled being in free communication through the perforations in said pipe, means for exhausting air from said measuring chamber through said perforate pipe, a source of liquid supply, said supply being in valve-controlled communication through said platform with said perforate pipe, and means for withdrawing liquid from said measuring chamber.

4. In liquid-dispensing apparatus a fixture including a platform, a measuring chamber mounted on said platform, a valve chest mounted on said platform, a source of liquid supply communicating from below by means of a valved passageway through said platform to said measuring chamber, a spiraled pipe connection from said measuring chamber to said valve chest, means for exerting suction through said valve chest and pipe connection to said measuring chamber, and means for discharging liquid from said measuring chamber.

5. In liquid-dispensing apparatus a fixture including a platform, a measuring chamber borne on said platform and means for alternately filling and emptying said measuring chamber, such means including an air exhaust line leading from the measuring chamber and a valve chest arranged in the course of said air exhaust line and within which alternately the continuity of the air exhaust line is interrupted and closed again, a hood overhanging said measuring chamber, and a plurality of posts rising from said platform, one of said posts carrying said valve chest and another of said posts affording support for said hood and serving also as a conduit through which said air exhaust line leads.

6. In liquid-dispensing apparatus a fixture including a platform, a delivery chamber arranged beneath said platform, a measuring chamber arranged above said platform, a plurality of hollow posts rising from said platform, one communicating through the platform with the delivery chamber beneath, one communicating through the platform with space external to said delivery chamber, the post in communication with the delivery chamber sustaining and forming part of a valve chest, such valve chest being divided internally into upper, medial and lower valve chambers, and being provided with internal ports and with a valve adapted to bring the medial chamber alternately into communication with upper and lower chambers, a suction pipe leading through another of said posts and communicating with the upper valve chamber, the lower valve chamber being vented to the air, communication between measuring chamber and the medial chamber of the valve chest, a source of liquid supply, a valved passageway leading from said source of supply to said measuring chamber, communication from measuring chamber to delivery chamber, a valve controlling the communication last named, and means for shifting synchronously the valve in the valve chest and the valve controlling communication from measuring chamber to delivery chamber, and a hood overhanging valve chest and measuring chamber, one of said posts affording support for said hood.

7. In liquid-dispensing apparatus a fixture including a platform, a delivery chamber arranged beneath the platform, a measuring chamber arranged above the platform, a source of liquid supply communicating through a valved passageway with said measuring chamber, communication from measuring chamber to delivery chamber and a valve in the line of communication last named, a valve chest borne by said platform and subdivided internally into upper medial and lower chambers, the lower chamber communicating with said delivery chamber and with the open air, the medal chamber communicating with the measuring chamber, means for exhausting air from the upper chamber, and means for establishing alternate communication from the measuring chamber through the medial chamber of the valve chest with the upper and the lower chambers thereof, and means for shifting simultaneously the means last named and the valve in the line of communication from measuring chamber to delivery chamber, whereby when the valve last named is open, the measuring chamber is vented to the open air.

8. In liquid-dispensing apparatus a fixture including a platform, a discharge chamber arranged beneath the platform and a measuring chamber arranged above the platform, a plurality of hollow posts rising from said platform, a hood carried on said posts and overhanging said platform and the parts borne thereon, an electric light element carried by said hood, a valve chest borne by one of said posts, of which valve chest the hollow within the post forms part, a suction pipe leading through another of said posts to said valve chest, a light affording electric circuit leading through another of said posts to said light element, means for establishing alternate communication through said valve chest from the open air to the measuring chamber and from the measuring chamber to said suction pipe, a source of liquid supply, and means for establishing alternate communication from said source of liquid supply to said measuring chamber and from said measuring chamber to said delivery chamber.

9. In liquid-dispensing apparatus the combination of a source of liquid supply, a measuring chamber and a conduit leading from the source of supply to the measuring chamber, means for establishing within the measuring chamber alternately a condition of suction and a condition of communication with the open air, and a valve-controlled discharge orifice in the measuring chamber, a check valve in the conduit from the source of supply to the measuring chamber opening in the direction of flow indicated, and intermittently applicable means for throwing said check valve out of service, the conduit then remaining open.

10. In liquid-dispensing apparatus the combination of a source of liquid supply, a measuring chamber arranged above said source of supply, a conduit leading from said source of supply to the measuring chamber, a downwardly closing check valve in said conduit, a discharge conduit leading from said measuring chamber, a valve normally cutting off flow through said discharge conduit, air-exhausting apparatus, movable means for establishing the measuring chamber in communication alternately with the air-exhausting apparatus and with the open air, and means for shifting alternately the said cut-off valve for the discharge pipe and the movable means last named above.

11. In liquid dispensing apparatus a measuring chamber, a supply conduit leading to said chamber, a suction conduit leading upwardly from said chamber, and an upwardly closing valve in said conduit arranged to be buoyed up by the tide of liquid rising in said measuring chamber, said valve being provided with an extended and spirally grooved body and forming when the valve is open, in cooperation with the conduit wall, a spiral passageway.

12. In liquid-dispensing apparatus the combination with a measuring chamber adapted to be filled by suction and emptied by gravity, of means for exhausting air from said measuring chamber, such means including a swinging crank arm; a source of liquid supply, a supply pipe leading from said source of supply to said measuring chamber, a check valve in said suply pipe, gravity operated means normally holding said valve in raised and ineffective position, and means adapted to be engaged by said crank arm for rendering ineffective said gravity-operated means, to allow said valve to seat and to function as a check valve.

13. In liquid-dispensing apparatus the combination with a measuring chamber adapted to be filled by suction and emptied by gravity, means for exhausting air from said measuring chamber, a source of liquid supply, a supply pipe leading from said source of supply to said measuring chamber, a check valve in said supply pipe, a discharge port in the bottom of said measuring chamber, a valve normally closing said port, means for unseating the valve last named, such means including a swinging crank arm, and means normally holding the said check valve in the supply pipe in raised and ineffective position, said means being adapted to be engaged by said crank arm and shifted by said crank arm to ineffective position, allowing the check valve to seat and function as a check valve.

In testimony whereof I have hereunto set my hand.

GEORGE W. MacKENZIE.